United States Patent
Chen et al.

(10) Patent No.: US 11,567,495 B2
(45) Date of Patent: Jan. 31, 2023

(54) METHODS AND SYSTEMS FOR SELECTING MACHINE LEARNING MODELS TO PREDICT DISTRIBUTED COMPUTING RESOURCES

(71) Applicant: Toyota Motor Engineering & Manufacturing North America, Inc., Plano, TX (US)

(72) Inventors: Dawei Chen, Mountain View, CA (US); Yin-Chen Liu, Mountain View, CA (US); BaekGyu Kim, Mountain View, CA (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 534 days.

(21) Appl. No.: 16/710,590

(22) Filed: Dec. 11, 2019

(65) Prior Publication Data

US 2021/0181739 A1    Jun. 17, 2021

(51) Int. Cl.
| | |
|---|---|
| G05D 1/00 | (2006.01) |
| B60W 40/105 | (2012.01) |
| G06F 9/50 | (2006.01) |
| G06K 9/62 | (2022.01) |
| G06N 20/00 | (2019.01) |
| G06F 11/30 | (2006.01) |
| H04L 67/1001 | (2022.01) |

(52) U.S. Cl.
CPC ......... *G05D 1/0088* (2013.01); *B60W 40/105* (2013.01); *G06F 9/5027* (2013.01); *G06F 11/3006* (2013.01); *G06K 9/6256* (2013.01); *G06N 20/00* (2019.01); *H04L 67/1001* (2022.05); *G05D 2201/0213* (2013.01)

(58) Field of Classification Search
CPC ......... G05D 1/0088; G05D 2201/0213; G06N 20/00; H04L 67/1001; B60W 40/105; G06F 9/5027; G06F 11/3006; G06K 9/6256

See application file for complete search history.

(56) References Cited

U.S. PATENT DOCUMENTS

| | | | |
|---|---|---|---|
| 8,209,695 B1 | 6/2012 | Pruyne et al. | |
| 8,583,799 B2 | 11/2013 | Podila | |
| 9,330,362 B2 * | 5/2016 | Bilenko | G06N 20/00 |
| 10,990,837 B1 * | 4/2021 | Simoncini | G06K 9/6228 |

(Continued)

FOREIGN PATENT DOCUMENTS

| | | |
|---|---|---|
| CN | 107505944 A | 12/2017 |
| CN | 109885392 A | 6/2019 |
| KR | 20180098798 A | 9/2018 |

OTHER PUBLICATIONS

Hu, Rongdong et al., "Efficient Resources Provisioning Based on Load Forecasting in Cloud", The Scientific World Journal, Feb. 20, 2014, 12 pages, vol. 2014, Article ID 321231.

(Continued)

*Primary Examiner* — Ramsey Refai
(74) *Attorney, Agent, or Firm* — Dinsmore & Shohl LLP

(57) ABSTRACT

A method includes receiving a request from a vehicle to perform a computing task, selecting a machine learning model from among a plurality of machine learning models based at least in part on the request, and predicting an amount of computing resources needed to perform the computing task using the selected machine learning model.

19 Claims, 15 Drawing Sheets

(56) References Cited

U.S. PATENT DOCUMENTS

| | | |
|---|---|---|
| 2017/0163554 A1 | 6/2017 | Das et al. |
| 2018/0121814 A1* | 5/2018 | Yu .............................. G06N 3/04 |
| 2019/0095785 A1* | 3/2019 | Sarkar ....................... G06N 3/08 |
| 2019/0171988 A1 | 6/2019 | Kwatra et al. |
| 2019/0179564 A1 | 6/2019 | Bernat et al. |
| 2019/0232955 A1 | 8/2019 | Grimm et al. |
| 2020/0125956 A1* | 4/2020 | Ravi ..................... G06N 3/0454 |
| 2020/0166928 A1* | 5/2020 | Sudarsan ................ G06V 20/52 |
| 2020/0191069 A1* | 6/2020 | Naidu .................... B60W 40/10 |
| 2020/0272509 A1* | 8/2020 | Wright .................. G06F 9/5038 |
| 2021/0124961 A1* | 4/2021 | Simoncini ............... G06N 20/20 |

OTHER PUBLICATIONS

Kumar, K. Dinesh et al., "Resource Provisioning in Cloud Computing Using Prediction Models: A Survey", International Journal of Pure and Applied Mathematics, Mar. 27, 2018, p. 333-342, vol. 119, No. 9.

* cited by examiner

SUMMARY OF RESULTS FOR MULTI-INTERSECTION SCENARIO

| Dataset | Multi-Intersections-30-B | | | Multi-Intersections-60-B | | | Multi-Intersections-100-B | | |
|---|---|---|---|---|---|---|---|---|---|
| Model | RMSE | MAPE | MEGH | RMSE | MAPE | MEGH | RMSE | MAPE | MEGH |
| LSTM | 33.18 | 13.14 | 1.80 | 82.85 | 6.87 | 2.26 | 108.03 | 4.11 | 1.88 |
| BiLSTM | 50.07 | 21.26 | 2.70 | 58.32 | 4.98 | 1.55 | 289.61 | 12.07 | 5.45 |
| S-LSTM | 43.19 | 17.81 | 2.34 | 155.58 | 12.87 | 4.34 | 354.29 | 15.20 | 6.79 |
| S-BiLSTM | 49.39 | 19.90 | 2.60 | 170.55 | 14.98 | 4.57 | 89.52 | 3.19 | 1.47 |
| S-LSTM-D | 43.11 | 16.50 | 2.30 | 81.27 | 6.06 | 2.01 | 352.13 | 14.96 | 6.67 |
| S-BiLSTM-D | 42.78 | 17.34 | 2.34 | 75.08 | 5.88 | 1.93 | 224.16 | 8.55 | 3.83 |

| Dataset | Multi-Intersections-30-S | | | Multi-Intersections-60-S | | | Multi-Intersections-100-S | | |
|---|---|---|---|---|---|---|---|---|---|
| Model | RMSE | MAPE | MEGH | RMSE | MAPE | MEGH | RMSE | MAPE | MEGH |
| LSTM | 15.87 | – | 1.74 | 16.53 | 11.24 | 1.18 | 32.59 | 4.28 | 1.06 |
| BiLSTM | 16.70 | – | 1.93 | 27.46 | 19.31 | 1.93 | 42.63 | 5.98 | 1.46 |
| S-LSTM | 28.24 | – | 2.87 | 20.43 | 14.86 | 1.48 | 183.62 | 25.54 | 7.10 |
| S-BiLSTM | 24.12 | – | 2.76 | 19.77 | 13.16 | 1.38 | 49.06 | 6.51 | 1.56 |
| S-LSTM-D | 17.85 | – | 1.98 | 38.64 | 31.30 | 2.99 | 87.74 | 9.87 | 2.69 |
| S-BiLSTM-D | 17.54 | – | 1.93 | 24.55 | 19.33 | 1.88 | 39.35 | 5.07 | 1.28 |

FIG. 11

SUMMARY OF RESULTS FOR ROUNDABOUT SCENARIO

| Dataset | Roundabout-20-B | | | Roundabout-35-B | | | Roundabout-50-B | | |
|---|---|---|---|---|---|---|---|---|---|
| Model | RMSE | MAPE | MEGH | RMSE | MAPE | MEGH | RMSE | MAPE | MEGH |
| LSTM | 19.11 | – | 1.41 | 30.03 | 8.93 | 1.37 | 40.49 | 8.07 | 1.64 |
| BiLSTM | 32.64 | – | 2.54 | 28.00 | 8.11 | 1.26 | 119.53 | 25.64 | 4.98 |
| S-LSTM | 43.42 | – | 3.34 | 45.86 | 13.68 | 2.14 | 92.69 | 19.35 | 3.81 |
| S-BiLSTM | 33.84 | – | 2.65 | 66.48 | 25.44 | 3.57 | 73.26 | 14.86 | 2.90 |
| S-LSTM-D | 31.17 | – | 2.35 | 36.16 | 11.50 | 1.76 | 105.73 | 21.54 | 4.15 |
| S-BiLSTM-D | 35.98 | – | 2.80 | 59.11 | 22.80 | 3.27 | 83.02 | 17.18 | 3.34 |

| Dataset | Roundabout-20-S | | | Roundabout-35-S | | | Roundabout-50-S | | |
|---|---|---|---|---|---|---|---|---|---|
| Model | RMSE | MAPE | MEGH | RMSE | MAPE | MEGH | RMSE | MAPE | MEGH |
| LSTM | 11.18 | – | 1.63 | 10.64 | – | 1.10 | 12.98 | 10.24 | 0.96 |
| BiLSTM | 20.19 | – | 3.15 | 23.34 | – | 2.64 | 31.29 | 32.47 | 2.66 |
| S-LSTM | 15.45 | – | 2.44 | 23.13 | – | 3.12 | 27.06 | 25.25 | 2.12 |
| S-BiLSTM | 20.84 | – | 3.41 | 25.62 | – | 3.20 | 38.93 | 39.93 | 3.19 |
| S-LSTM-D | 14.67 | – | 2.31 | 17.48 | – | 2.48 | 49.38 | 53.17 | 4.21 |
| S-BiLSTM-D | 18.95 | – | 2.87 | 21.45 | – | 2.95 | 30.21 | 28.36 | 2.82 |

FIG. 12

SUMMARY OF RESULTS FOR HIGHWAY SCENARIO

| Dataset | Highway-30-B | | | Highway-60-B | | | Highway-100-B | | |
|---|---|---|---|---|---|---|---|---|---|
| Model | RMSE | MAPE | MEGH | RMSE | MAPE | MEGH | RMSE | MAPE | MEGH |
| LSTM | 26.47 | 17.68 | 1.77 | 121.37 | 11.79 | 3.70 | 48.38 | 2.47 | 0.94 |
| BiLSTM | 30.63 | 22.14 | 2.06 | 102.04 | 10.15 | 3.17 | 56.02 | 2.90 | 1.10 |
| S-LSTM | 38.56 | 23.90 | 2.65 | 180.54 | 18.10 | 5.78 | 98.95 | 5.40 | 2.07 |
| S-BiLSTM | 50.82 | 39.15 | 3.40 | 115.20 | 11.14 | 3.50 | 65.72 | 3.62 | 1.43 |
| S-LSTM-D | 52.65 | 38.73 | 3.51 | 148.55 | 15.05 | 4.76 | 68.31 | 3.71 | 1.48 |
| S-BiLSTM-D | 34.49 | 20.66 | 2.16 | 187.68 | 18.84 | 6.04 | 93.49 | 5.21 | 2.01 |

| Dataset | Highway-30-S | | | Highway-60-S | | | Highway-100-S | | |
|---|---|---|---|---|---|---|---|---|---|
| Model | RMSE | MAPE | MEGH | RMSE | MAPE | MEGH | RMSE | MAPE | MEGH |
| LSTM | 11.25 | – | 1.18 | 15.50 | – | 1.47 | 58.96 | 8.21 | 2.06 |
| BiLSTM | 13.03 | – | 1.54 | 46.17 | – | 5.46 | 30.97 | 4.45 | 1.04 |
| S-LSTM | 19.86 | – | 2.33 | 24.79 | – | 2.41 | 188.18 | 27.18 | 7.28 |
| S-BiLSTM | 23.63 | – | 2.57 | 23.66 | – | 2.24 | 99.96 | 14.61 | 3.72 |
| S-LSTM-D | 19.78 | – | 1.93 | 25.46 | – | 2.56 | 213.93 | 30.79 | 8.37 |
| S-BiLSTM-D | 24.75 | – | 2.50 | 21.11 | – | 1.98 | 47.77 | 6.18 | 1.52 |

FIG. 13

SUMMARY OF RESULTS FOR BRIDGE SCENARIO

| Dataset | Bridge-45-B | | | Bridge-90-B | | | Bridge-150-B | | |
|---|---|---|---|---|---|---|---|---|---|
| Model | RMSE | MAPE | MEGH | RMSE | MAPE | MEGH | RMSE | MAPE | MEGH |
| LSTM | 16.57 | 16.38 | 1.40 | 74.01 | 7.27 | 2.19 | 52.59 | 2.94 | 1.11 |
| BiLSTM | 19.52 | 24.76 | 1.63 | 105.20 | 9.88 | 2.93 | 71.93 | 4.22 | 1.59 |
| S-LSTM | 47.64 | 72.08 | 3.73 | 46.09 | 3.96 | 1.21 | 52.10 | 2.93 | 1.11 |
| S-BiLSTM | 21.82 | 21.08 | 1.82 | 64.89 | 6.11 | 1.85 | 43.53 | 2.33 | 0.89 |
| S-LSTM-D | 20.91 | 24.99 | 1.81 | 65.95 | 5.93 | 1.77 | 52.65 | 2.88 | 1.12 |
| S-BiLSTM-D | 23.36 | 28.93 | 2.01 | 120.86 | 11.48 | 3.40 | 145.20 | 8.96 | 3.58 |

| Dataset | Bridge-45-S | | | Bridge-90-S | | | Bridge-150-S | | |
|---|---|---|---|---|---|---|---|---|---|
| Model | RMSE | MAPE | MEGH | RMSE | MAPE | MEGH | RMSE | MAPE | MEGH |
| LSTM | 15.78 | 15.28 | 1.30 | 82.30 | 6.85 | 2.27 | 108.74 | 5.49 | 2.35 |
| BiLSTM | 16.43 | 15.98 | 1.39 | 165.65 | 14.34 | 4.85 | 105.76 | 4.74 | 1.93 |
| S-LSTM | 17.32 | 15.65 | 1.42 | 161.81 | 13.77 | 4.67 | 196.14 | 9.96 | 4.35 |
| S-BiLSTM | 19.03 | 19.07 | 1.63 | 127.81 | 10.79 | 3.63 | 241.47 | 12.49 | 5.48 |
| S-LSTM-D | 21.45 | 21.59 | 1.86 | 247.57 | 21.35 | 7.41 | 224.48 | 11.49 | 5.04 |
| S-BiLSTM-D | 20.03 | 20.16 | 1.65 | 152.22 | 13.04 | 4.41 | 169.66 | 8.66 | 3.76 |

FIG. 14

METHODS AND SYSTEMS FOR SELECTING MACHINE LEARNING MODELS TO PREDICT DISTRIBUTED COMPUTING RESOURCES

TECHNICAL FIELD

The present specification relates to predicting an amount of computing resources needed to perform a computing task requested by a vehicle, and more particularly, to selecting machine learning models to predict an amount of computing resources necessary to complete a computing task requested by a vehicle.

BACKGROUND

Autonomous vehicles depend for their operation on a large amount of data generated by built-in devices, such as cameras, sensors, and electronic control units. One estimate is that an autonomous vehicle will generate 4 TB of data per day. Thus, there may be significant challenges in processing such a large amount of data within vehicles. This may be especially so for real-time tasks with high computational complexity, such as image-based object detection, or tasks with high demands for storage capacity, such as updating driving records, uploading HD maps, or path planning. Accordingly, in order to meet the computing requirements for autonomous vehicles, these vehicles may use external computing platforms, such as edge servers or cloud computing platforms, to perform certain computing tasks.

When utilizing such external computing platforms, it is important to ensure that a sufficient amount of computing resources are available for performing the requested computing tasks. If a large number of autonomous vehicles are utilizing such external computing platforms, with each vehicle consuming significant computing resources, ensuring that sufficient resources are available for all of the vehicles may be challenging. Thus, it may be useful to predict the amount of resources that a vehicle will need to complete a computing task before the task is performed so that sufficient resources may be appropriately allocated.

Accordingly, a need exists for providing a method and system that predicts the amount of computing resources needed for a computing task when a request for the computing task is received.

SUMMARY

In one embodiment, a method includes receiving a request from a vehicle to perform a computing task, selecting a machine learning model from among a plurality of machine learning models based at least in part on the request, and predicting an amount of computing resources needed to perform the task using the selected machine learning model.

In another embodiment, an edge server is provided. The edge server includes one or more processors, one or more memory modules, and machine readable instructions stored in the one or more memory modules that, when executed by the one or more processors, cause the edge server to receive a request from a vehicle to perform a computing task, receive a driving status of the vehicle, select a machine learning model from among a plurality of machine learning models based at least in part on the request and the driving status, and based on the selected machine learning model, predict an amount of computing resources needed to perform the computing task.

In another embodiment, a system includes an edge server, a cloud server, and a resource manager. The cloud server is communicatively coupled to the edge server and the resource manager is communicatively coupled to the cloud server. The edge server is configured to receive, from a vehicle, a request to perform a computing task and driving status of the vehicle, select a machine learning model from among a plurality of machine learning models based at least in part on the request and the driving status, and predict an amount of computing resources needed to perform the computing task based on the selected machine learning model. The resource manager is configured to allocate an amount of computing resources for performing the computing task to the cloud server or the edge server. The cloud server is configured to use the allocated computing resources to perform the computing task.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 11 depicts simulation results of different machine learning models using the multi-intersection scenario of FIG. 10A;

FIG. 12 depicts simulation results of different machine learning models using the roundabout scenario of FIG. 10B;

FIG. 13 depicts simulation results of different machine learning models using the highway scenario of FIG. 10C; and FIG. 14 depicts simulation results of different machine learning models using the bridge scenario of FIG. 10D.

DETAILED DESCRIPTION

The embodiments disclosed herein include systems and methods for predicting an amount of computing resources needed to perform a computing task requested by a vehicle. An autonomous vehicle may collect a large amount of data from sensors and other devices as the vehicle is driven. This large data set may need to be analyzed or otherwise processed to ensure proper functioning of the autonomous vehicle. Because of the potentially large amount of data collected by the autonomous vehicle and the time-sensitive nature of certain data processing tasks (e.g., tasks needed to steer or otherwise navigate the vehicle), it may be desirable to perform certain data processing tasks using computing resources external to the vehicle. This may allow these tasks to be performed more quickly or efficiently than would be possible using onboard equipment of the autonomous vehicle.

Accordingly, as an autonomous vehicle is driving and collecting data, the vehicle may request that one or more computing tasks be performed by a computing device external to the vehicle. This external computing device may be a roadside unit, an edge server, a cloud computing service, or the like. Once an external computing device receives a request to perform a computing task, it may be desirable to estimate the amount of computing resources that will be needed to perform the computing task. This may allow the computing device to ensure that sufficient computing resources are available to perform the task. This may be especially important when a large number of vehicles are requesting the performance of computing tasks.

One method that can be used to estimate an amount of computing resources needed to perform a computing task is machine learning. In machine learning, a large amount of training data is obtained and used to train a machine-learning model. In examples disclosed herein, training data may comprise historical data relating various types of computing tasks to an amount of computing resources needed to complete those tasks. Once a machine learning algorithm is trained, the trained model may be used to make future predictions. For example, when a request to perform a particular computing task is received, a trained machine learning model may be used to predict an amount of computing resources needed to perform the task based on the particular characteristics of the task.

When using machine learning in this manner, a number of different machine learning models may be used. Different machine learning models may have different strengths and weaknesses as compared to other models. For example, one machine learning model may operate more quickly while another machine learning model may use less memory. Accordingly, it may be desirable to select an appropriate machine learning model for different purposes. As such, the present disclosure selects a machine learning model to predict an amount of computing resources needed to perform a particular computing task.

Figure 1:
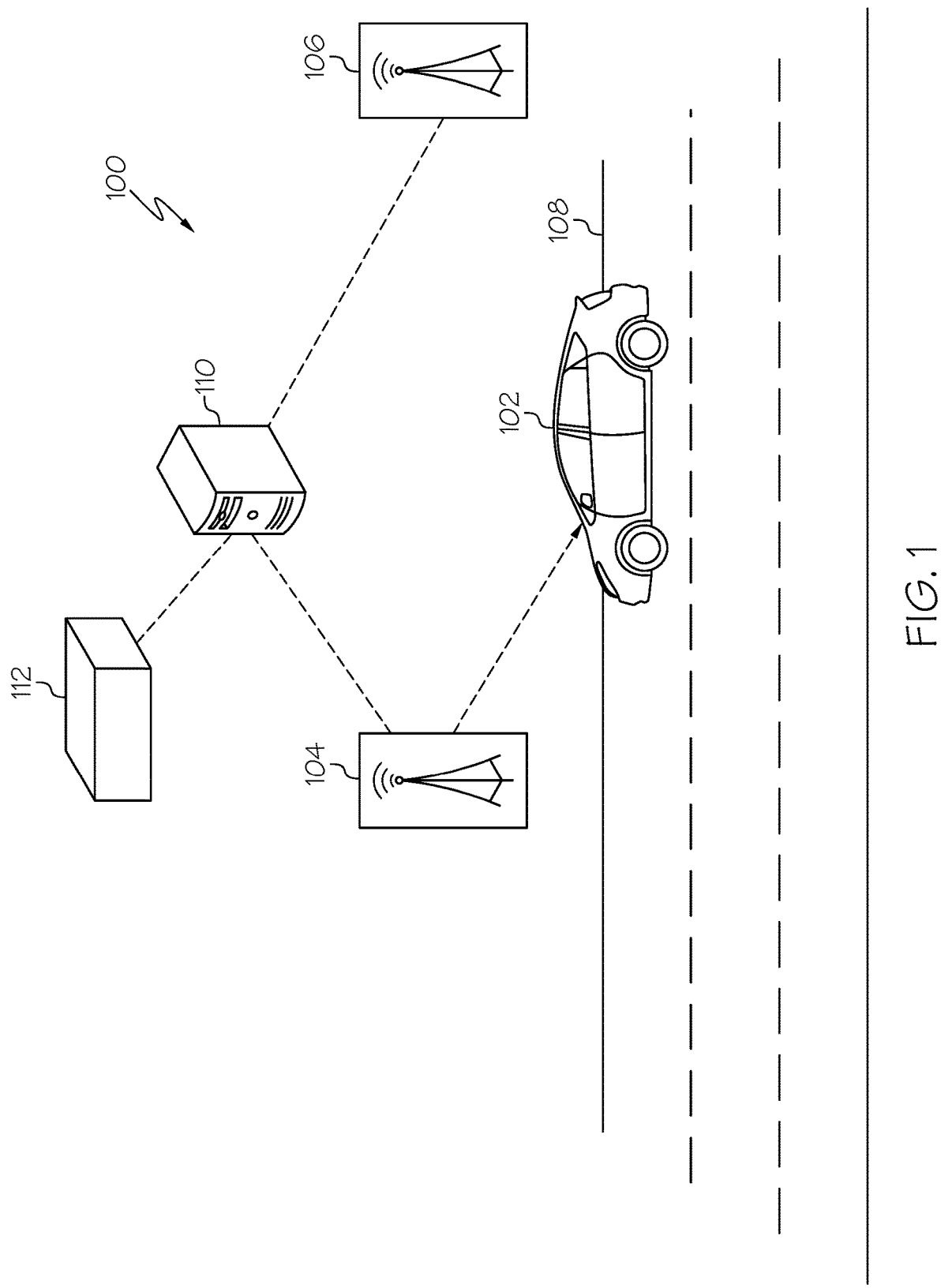
FIG. 1 schematically depicts a system for predicting an amount of computing resources needed to perform a computing task requested by a vehicle, according to one or more embodiments shown and described herein.

FIG. 1 schematically depicts a system for performing computing tasks requested by a vehicle. A system 100 includes a vehicle 102, a plurality of edge servers 104, 106, a cloud server 110, and a resource manager 112. In the illustrated example, the vehicle 102 may be an autonomous vehicle that navigates its environment with limited human input or without human input. In other examples, the vehicle 102 may be a non-autonomous vehicle. In the example of FIG. 1, the vehicle 102 drives along a road 108.

The edge servers 104, 106 are communicatively coupled to the vehicle 102 and the cloud server 110. The cloud server 110 may be deployed in a cloud computing system, and may manage the plurality of edge servers 104, 106. In the illustrated example of FIG. 1, two edge servers 104, 106 are shown. However, it should be understood that the system 100 may contain any number of edge servers.

In the illustrated example, the edge servers 104, 106 are fixed edge servers, e.g., road-side units (RSUs). In some embodiments, the edge servers 104, 106 may be moving edge servers, e.g., other vehicles on the road 108. In the illustrated example, the edge servers 104, 106 may be positioned near a road 108 such that they can be communicatively coupled to the vehicle 102. The edge servers 104, 106 may be spaced such that each edge server covers a different service area. That is, as the vehicle 102 drives along the road 108, it is always within range of at least one edge server such that the vehicle 102 may be connected to that edge server. Thus, as the vehicle 102 drives along the road 108, it may move between coverage areas of different edge servers. If the vehicle 102 is within range of multiple edge servers, the vehicle 102 may connect to the edge server that is underutilized.

In the illustrated embodiment of FIG. 1, when the vehicle 102 is within range of the edge server 104, the vehicle 102 may transmit to the edge server 104, a request for a computing task to be performed along with data about the vehicle 102 and/or a driving status of the vehicle. The requested computing task may be, but is not limited to, a request for object detection, pedestrian detection, collaborative simultaneous localization and mapping, collaborative perception, path planning, and the like. Data about the vehicle 102 or the driving status of the vehicle may include data gathered from sensors and/or other instruments of the vehicle 102. The data may include, but is not limited to, sensor data, images captured by cameras or other imaging devices, a speed of the vehicle 102, and the like. In some embodiments, the vehicle 102 may communicate directly with the cloud server 110 instead of the edge server 104.

In the illustrated embodiment, after receiving a computing task request and driving status of the vehicle 102, the edge server 104 may analyze the requested computing task and the driving status of the vehicle 102 and select a machine learning model to be used to predict an amount of computing resources needed to perform the computing task, as explained in further detail below. After selecting an appropriate machine learning model, the edge server 104 may use the selected machine learning model to predict the amount of computing resources needed to perform the computing task. The vehicle 102 may then reserve an amount of resources sufficient to perform the computing task, as estimated by the selected machine learning model. The resource manager 112 may receive a request from the vehicle 102 to reserve computing resources and may allocate resources to the appropriate locations (e.g., the edge servers 104, 106, the cloud server 110) sufficient to perform the computing task. The reserved resources may then be consumed to perform the task.

Figure 2:
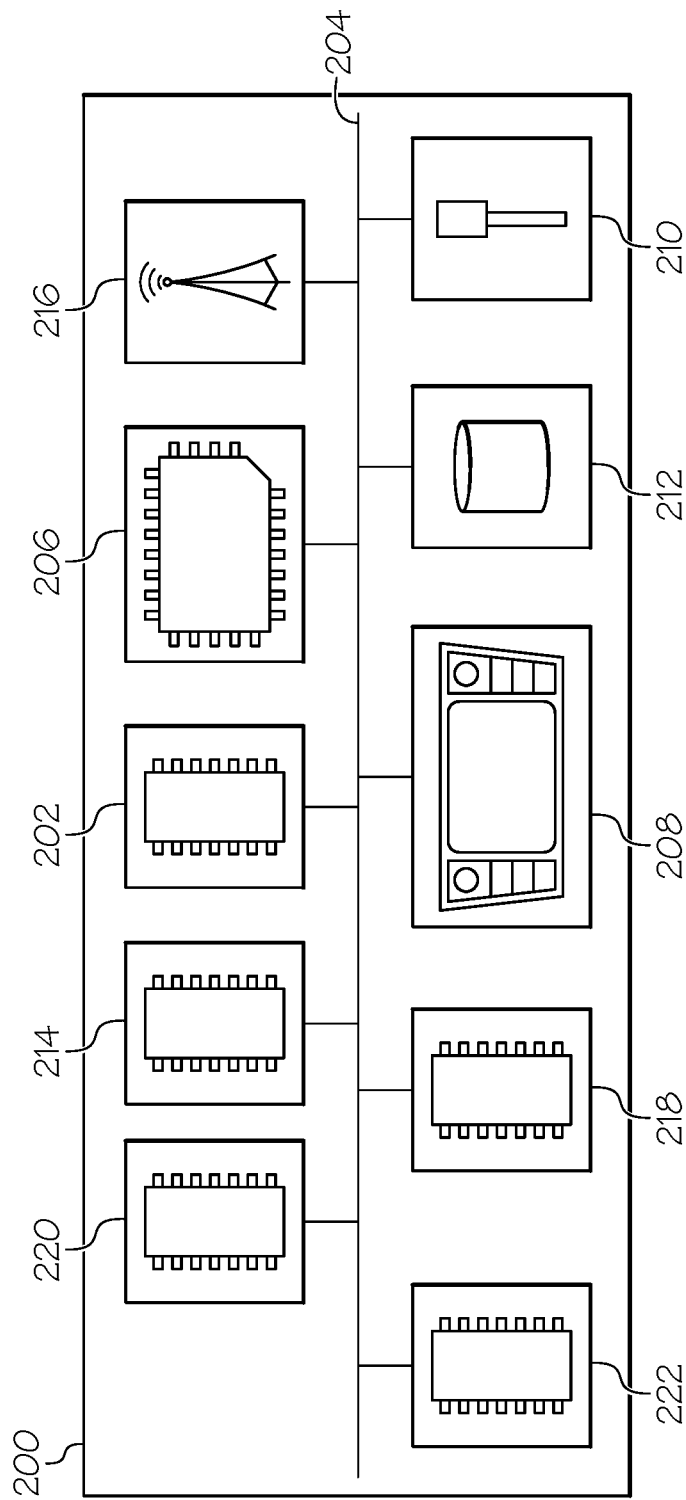
FIG. 2 depicts a schematic diagram of a vehicle system, according to one or more embodiments shown and described herein.

FIG. 2 depicts a vehicle system 200 included in the vehicle 102 of FIG. 1. The vehicle system 200 includes one or more processors 202, a communication path 204, one or more memory modules 206, a screen 208, a satellite antenna 210, one or more vehicle sensors 212, an autonomous driving module 214, network interface hardware 216, a task requesting module 218, a task scheme selection module 220, and a reservation request module 222, the details of which will be set forth in the following paragraphs.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 200 comprises a screen 208 for providing visual output such as, for example, maps, navigation, entertainment, or a combination thereof. The screen 208 may output one of a map, navigation, and entertainment. The screen 208 is coupled to the communication path 204. Accordingly, the communication path 204 communicatively couples the screen 208 to other modules of the vehicle system 200 including, without limitation, the one or more processors 202 and/or the one or more memory modules 206. In embodiments, the screen 208 may be a touchscreen that, in addition to visually displaying information, detects the presence and location of a tactile input upon a surface of or adjacent to the screen 208. For example, a driver or occupant of the vehicle 102 may input a current traffic information request through the screen 208. Accordingly, each display may receive mechanical (e.g., touch) input directly upon the optical output provided by the screen 208.

The vehicle system 200 comprises a satellite antenna 210 coupled to the communication path 204 such that the communication path 204 communicatively couples the satellite antenna 210 to other modules of the vehicle system 200. The satellite antenna 210 is configured to receive signals from global positioning system satellites. Specifically, in one embodiment, the satellite antenna 210 includes one or more conductive elements that interact with electromagnetic signals transmitted by global positioning system satellites. The received signal is transformed into a data signal indicative of the location (e.g., latitude and longitude) of the satellite antenna 210 or an object positioned near the satellite antenna 210, by the one or more processors 202. Based on the location, the vehicle system 200 may determine a type of the road on which the vehicle is currently traveling. For example, the vehicle system 200 may match the location of the vehicle with a map that including information about roads and determines the type of the road.

The vehicle system 200 comprises one or more vehicle sensors 212. Each of the one or more vehicle sensors 212 is coupled to the communication path 204 and communicatively coupled to the one or more processors 202. The one or more sensors 212 may include, but are not limited to, LiDAR sensors, RADAR sensors, optical sensors (e.g., cameras, laser sensors, proximity sensors, location sensors (e.g., GPS modules)), and the like. The sensors 212 may monitor the surroundings of the vehicle 102 and the data gathered by the sensors may be used by an autonomous driving module 214 to autonomously navigate the vehicle 102, as discussed below.

Still referring to FIG. 2, the vehicle system 200 comprises an autonomous driving module 214. The autonomous driving module 214 is coupled to the communication path 204 and communicatively coupled to the one or more processors 202. The autonomous driving module 214 causes the vehicle 102 to be autonomously driven based on data gathered by the sensors 212 and information about the driving state of the vehicle 102, such as speed and orientation. That is the autonomous driving module 214 may adjust the acceleration, braking, steering, and other features of the vehicle 102 to navigate the vehicle along a road to a desired destination.

Still referring to FIG. 2, the vehicle system 200 comprises network interface hardware 216 for communicatively coupling the vehicle system 200 to the edge server 104. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the vehicle system 200 may transmit a request for a computing task along with a vehicle driving status to the edge server 104.

Still referring to FIG. 2, the vehicle system 200 comprises a task requesting module 218. The task requesting module 218 is coupled to the communication path 204 and communicatively coupled to the one or more processors 202. The task requesting module 218 may formulate a request for a computing task to be performed. The computing task may involve the processing of data collected by the sensors 212 and may be used by the autonomous driving module 214 to perform one or more aspects of autonomously driving the vehicle 102. For example, a computing task requested by the task requesting module 218 may comprise object detection, pedestrian detection, collaborative simultaneous localization and mapping, collaborative perception, path planning, and the like. Once the task requesting module 218 formulates a computing task to request, the request may be transmitted by the network interface hardware 216 to the edge server 104.

Still referring to FIG. 2, the vehicle system 200 comprises a task scheme selection module 220. The task scheme selection module 220 is coupled to the communication path 204 and communicatively coupled to the one or more processors 202. After the task requesting module 218 formulates a computing task, the task scheme selection module 220 may determine a task generation frequency for the computing task. The task generation frequency determines the frequency with which data is sent and/or received by the vehicle 102 to or from the edge server 104.

The task generation frequency may be periodic or non-periodic and if the task generation frequency is periodic, it may be time-based, mileage-based, or velocity-based. A time-based task generation scheme involves transmitting or receiving data at periodic time intervals. For example, if the task involves uploading driving records of the vehicle 102, the uploading may occur repeatedly at set time intervals. A mileage-based task generation scheme involves transmitting or receiving data after the vehicle 102 travels a periodic distance. For example, if the task involves updating an HD map, then the map may be updated every time the vehicle 102 travels a certain distance (e.g., a specific number of miles). A velocity-based task generation scheme involves transmitting or receiving data whenever the speed of the vehicle 102 changes by an amount greater than a predetermined threshold. For example, if the task involves navigation service of path planning, driving status may be uploaded whenever the speed of the vehicle changes by more than a certain amount. If the task generation frequency is non-periodic, data may be transmitted at non-periodic intervals.

Still referring to FIG. 2, the vehicle system 200 comprises a reservation request module 222. The reservation request module 222 is coupled to the communication path 204 and communicatively coupled to the one or more processors 202. The reservation request module 222 may submit a request to the resource manager 112 (See FIG. 1) to reserve certain computing resources. The reservation request module 222 may submit this request to the resource manager 112 through the network interface hardware 216. The reservation request module 222 may request that computing resources be reserved based on an amount of resources that the edge server 104 estimates are needed to complete the computing task, as explained in further detail below in connection with FIG. 4.

In some embodiments, the vehicle system 200 may be communicatively coupled to the edge server 104 and/or the resource manager 112 by a network (not shown). In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 3:
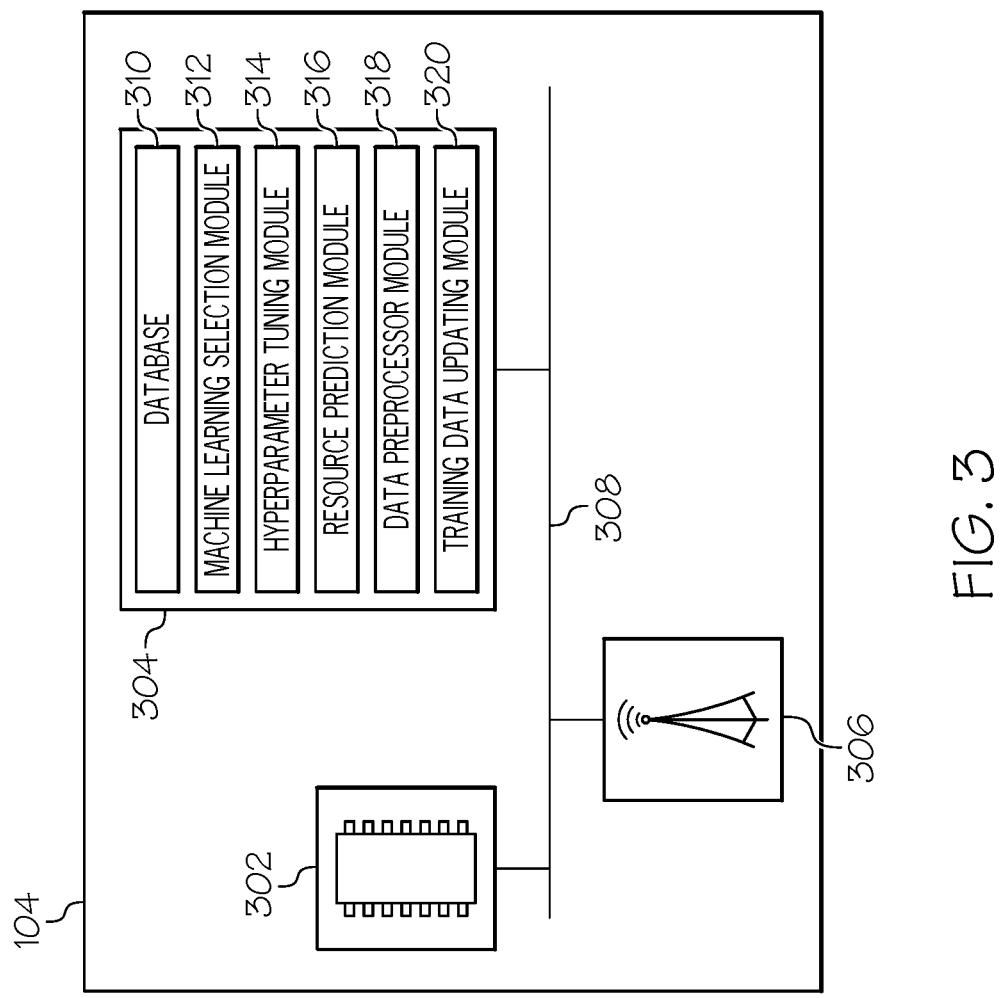
FIG. 3 depicts a schematic diagram of an edge server for predicting an amount of computing resources needed to perform a computing task requested by a vehicle, according to one or more embodiments shown and described herein.

Now referring to FIG. 3, the edge server 104 comprises one or more processors, 302, one or more memory modules 304, network interface hardware 306, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. The network interface hardware 306 of the edge server 104 may transmit and receive data to and from the vehicle 102.

The one or more memory modules 304 include a database 310, a machine learning selection module 312, a hyperparameter tuning module 314, a resource prediction module 316, a data preprocessor module 318, and a training data updating module 320. Each of the database 310, the machine learning selection module 312, the hyperparameter tuning module 314 the resource prediction module 316, the data preprocessor module 318, and the training data updating module 320 may be a program module in the form of operating systems, application program modules, and other program modules stored in one or more memory modules 304. In some embodiments, the program module may be stored in a remote storage device that may communicate with the edge server 104. In some embodiments, one or more of the database 310, the machine learning selection module 312, the hyperparameter tuning module 314, the resource prediction module 316, the data preprocessor module 318, and the training data updating module 320 may be stored in the one or more memory modules 206 of the vehicle system 200. Such a program module may include, but is not limited to, routines, subroutines, programs, objects, components, data structures and the like for performing specific tasks or executing specific data types as will be described below.

The database 310 may temporarily store data received from the vehicle 102 including requests for the performance of one or more computing tasks along with a task generation frequency and information about the driving status of the vehicle. The database 310 may also store a plurality of machine learning models. The plurality of machine learning models may include a variety of different types of machine learning models including long short-term memory (LSTM), artificial neural network (ANN), deep neural network (DNN), recurrent neural network (RNN), convolutional neural network (CNN), and the like. Each of the machine learning models stored in the database 310 may be trained and used to predict an amount of computing resources needed to perform a computing task based on information received from the vehicle 102 (e.g., based on the type of the computing task, the task generation frequency, the driving status of the vehicle, etc.).

The machine learning selection module 312 may analyze the information received from the vehicle 102 regarding a computing task to be performed and the driving status of the vehicle 102 and select an appropriate machine learning model from the database 310 to use to predict the amount of computing resources needed to perform the computing task. Each of the machine learning models in the database 310 have different features that make them more or less suited to estimate the computing resources needed to perform a computing task depending on the a variety of factors related to the computing task. For example, if a task deadline is near and the task is deadline sensitive, the machine learning selection module 312 may select a machine-learning model with less computational complexity such that the deadline can be met. Accordingly, the machine learning selection module 312 may select a machine learning model based on a variety of factors including, but not limited to, the speed of the vehicle 102 (e.g., 50 mph, 60 mph, 70 mph), the position of the vehicle 102, the size of the computing task (e.g., the memory required such as 30 MB, 50 MB, 100 MB), the application type of the computing task (e.g., pedestrian detection, HD map uploading, path planning, etc.), the task deadline (e.g., 100 milliseconds, 10 seconds, 10 minutes), the time sensitivity of the task (e.g., hard deadline or soft deadline), and the task frequency (e.g., one task per second, one task per mile, etc.).

The hyperparameter tuning module 314 may tune one or more hyperparameters of the machine learning model selected by the machine learning selection module 312. Hyperparameter tuning may be needed for properly training machine learning models during a training phase as different combinations of parameters may influence the accuracy and convergence speed of the model. Accordingly, the hyperparameter tuning module 314 helps to find the ideal parameters for the machine learning model selected by the machine learning selection module 312 based on the data and other information received from the vehicle 102. The hyperparameter tuning module 314 may tune a variety of parameters for a selected machine learning model including, but not limited to, a number of hidden layers, a number of hidden units in each layer, a learning rate, momentum, an activation function (e.g., Sigmoid function, Relu function, Tan h function, etc.), a dropout rate, and a batch size.

The resource prediction module 316 uses the machine learning model selected by the machine learning selection module 312 to predict the amount of computing resources needed to perform the computing task. The resources needed to perform the computing task may include, but are not limited to, the memory consumption required, the power required, and the bandwidth required. After the resource prediction module 316 predicts the amount of computing resources needed to perform the computing task, the edge server 104 may transmit this data to the vehicle 102. The vehicle 102 can then reserve this amount of resources with the resource manager 112 and these resources can be consumed to perform the computing task, as explained in further detail below in connection with FIG. 4. In some embodiments, the edge server 104 may allocate resources to perform the computing task or may transmit the predicted amount of computing resources to the resource manager 112 rather than the vehicle 102.

As will be described in further detail below, the data preprocessor module 318 performs preprocessing on the data relating to the actual amount of resources used to perform the computing task. The data preprocessor may perform the tasks of, but not limited to, normalizing the data, removing outliers, and the like. As will be described in further detail below, the training data updating module 320 may update training data associated with the selected machine learning model.

Figure 4:
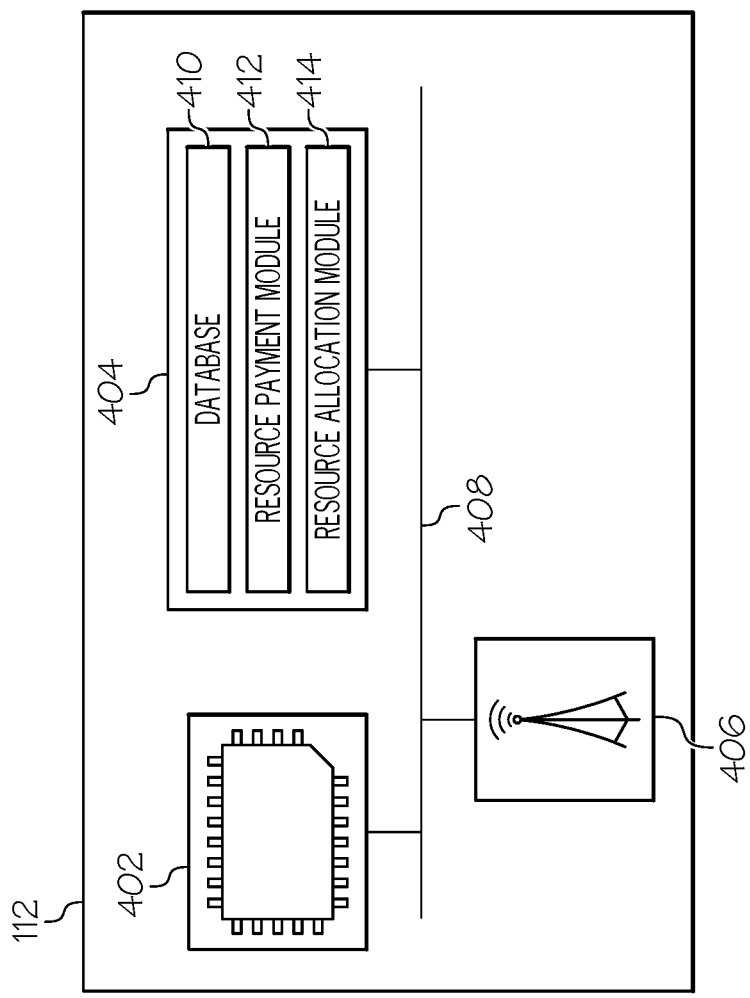
FIG. 4 depicts a schematic diagram of a resource manager for allocating computing resources, according to one or more embodiments shown and described herein.

Now referring to FIG. 4, the resource manager 112 comprises one or more processors, 402, one or more memory modules 404, network interface hardware 406, and a communication path 408. The one or more processors 402 may be a controller, an integrated circuit, a microchip, a computer, or any other computing device. The one or more memory modules 404 may comprise RAM, ROM, flash memories, hard drives, or any device capable of storing machine readable and executable instructions such that the machine readable and executable instructions can be accessed by the one or more processors 402.

The network interface hardware 406 can be communicatively coupled to the communication path 408 and can be any device capable of transmitting and/or receiving data via a network. Accordingly, the network interface hardware 406 can include a communication transceiver for sending and/or receiving any wired or wireless communication. For example, the network interface hardware 406 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 406 includes hardware configured to operate in accordance with the Bluetooth® wireless communication protocol. The network interface hardware 406 of the resource manager 112 may transmit and receive data to and from the vehicle 102, the edge servers 104, 106, and the cloud server 110.

The one or more memory modules 404 include a database 410, a resource payment module 412, and a resource allocation module 414. Each of the database 410, the resource payment module 412, and the resource allocation module 414 may be a program module in the form of operating systems, application program modules, and other program modules stored in one or more memory modules 404. In some embodiments, the program module may be stored in a remote storage device that may communicate with the edge server 104 and/or the cloud server 110. In some embodiments, one or more of the database 410, the resource payment module 412, and the resource allocation module 414 may be stored in the one or more memory modules 304 of the edge server 104. Such a program module may include, but is not limited to, routines, subroutines, programs, objects, components, data structures and the like for performing specific tasks or executing specific data types as will be described below.

Still referring to FIG. 4, the database 410 may temporarily store data received from the vehicle 102 and/or the cloud server 110. This data may include reservation requests for computing resources received from the vehicle 102 as explained above. This data may also include resource consumption data received from the cloud server 110 as explained in further detail below.

Still referring to FIG. 4, the resource payment module 412 may handle payments from the vehicle 102 for resource reservations. As explained above, after the edge server 104 predicts the amount of computing resources needed to perform a computing task, the vehicle 102 may request that the necessary computing resources be received. The resource payment module 412 may then request and receive payment from the vehicle 102 for the requested resources. Specifically, the resource payment module 412 may receive a request from the vehicle 102 to reserve certain computing resources. After receiving such a request, the resource payment module 412 may submit a charging request to the vehicle 102 requesting payment for the resources to be reserved. The resource payment module 412 may then receive payment information from the vehicle 102 and may then transmit a confirmation of the resource reservation to the vehicle 102.

Still referring to FIG. 4, the resource allocation module 414 may allocate computing resources as requested by the vehicle 102. In the illustrated embodiment, the resource allocation module 414 allocates computing resources requested by the vehicle 102 after the resource payment module 412 has processed payment for the resources. Specifically, after the resource manager 112 receives a request to reserve certain computing resources and the resource payment module 412 processes payment for the requested resources, the resource allocation module 414 may determine whether the amount of currently allocated resources available to perform the computing task are sufficient to perform the task. For example, the resource allocation module 414 may determine if the resources allocated to the edge server 104 (which provides coverage to the area that the vehicle 102 is in) and/or the cloud server 110 are sufficient for the resources requested by the vehicle 102. If the currently allocated resources are less than the requested resources, the resource allocation module 414 may allocate additional resources (e.g., from the edge server 106 to the edge server 104 or another cloud server to the cloud server 110). If the currently allocated resources are greater than the requested resources, the resource allocation module 414 may move the excess resources to another service area (e.g., from the edge server 104 to the edge server 106) such that overall resource utility may be improved.

Figure 5:
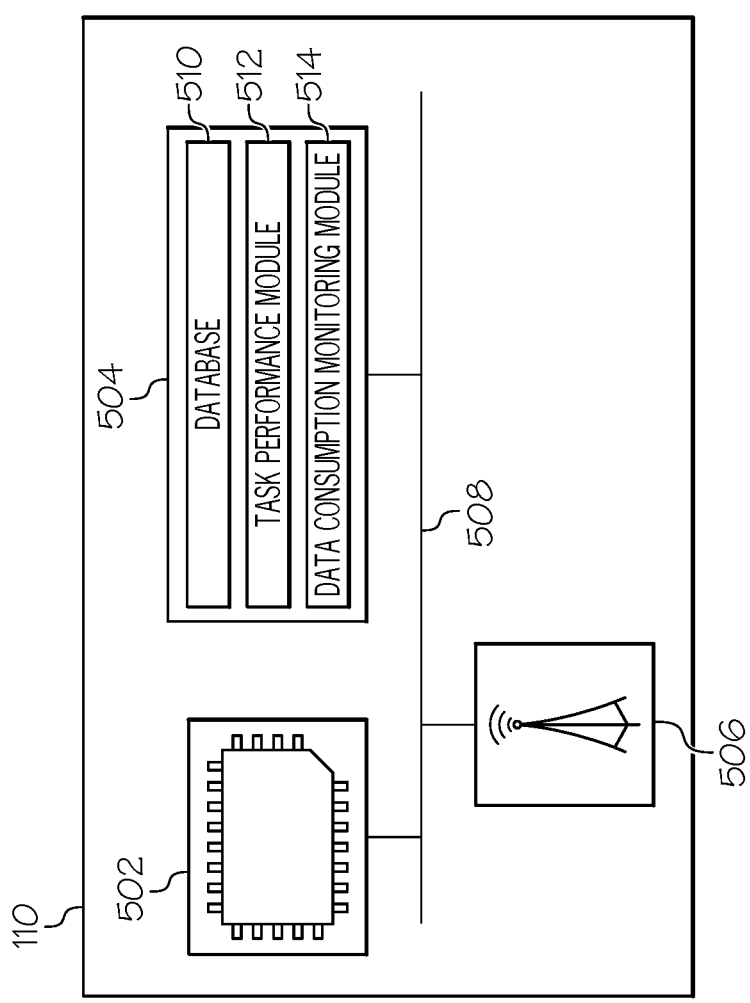
FIG. 5 depicts a schematic diagram of a cloud server for performing a computing task, according to one or more embodiments shown and described herein.

Now referring to FIG. 5, the cloud server 110 comprises one or more processors, 502, one or more memory modules 504, network interface hardware 506, and a communication path 508. The one or more processors 502 may be a controller, an integrated circuit, a microchip, a computer, or any other computing device. The one or more memory modules 504 may comprise RAM, ROM, flash memories, hard drives, or any device capable of storing machine readable and executable instructions such that the machine readable and executable instructions can be accessed by the one or more processors 502.

The network interface hardware 506 can be communicatively coupled to the communication path 508 and can be any device capable of transmitting and/or receiving data via a network. Accordingly, the network interface hardware 506 can include a communication transceiver for sending and/or receiving any wired or wireless communication. For example, the network interface hardware 506 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 506 includes hardware configured to operate in accordance with the Bluetooth® wireless communication protocol. The network interface hardware 506 of the cloud server 110 may transmit and receive data to and from the vehicle 102 and the resource manager 112.

The one or more memory modules 504 include a database 510, a task performance module 512, and a data consumption monitoring module 514. Each of the database 510, the task performance module 512, and the data consumption monitoring module 514 may be a program module in the form of operating systems, application program modules, and other program modules stored in one or more memory modules 504. In some embodiments, the program module may be stored in a remote storage device that may communicate with the edge server 104 and/or the resource manager 112. Such a program module may include, but is not limited to, routines, subroutines, programs, objects, components, data structures and the like for performing specific tasks or executing specific data types as will be described below.

Still referring to FIG. 5, the database 510 may temporarily store computing task requests received from the vehicle 102. This may include the computing task to be performed, the task generation frequency, information about the vehicle 102, driving status of the vehicle 102, and other information needed to perform a computing task.

Still referring to FIG. 5, the task performance module 512 may perform the computing task requested by the vehicle 102 by consuming the resources allocated by the resource manager 112. While performing the computing task, the task performance module 512 may access data in the database 510 sent from the vehicle 102 relating to the task. While performing the task, the network interface hardware 506 may receive additional data from the vehicle 102 related to the task (e.g., updated driving status), which may be stored in the database 510. The task performance module 512 may access this additional data in the database 510 while performing the task. In addition, the task performance module 512 may send data related to the task to the vehicle 102 via the network interface hardware 506 while the task is being performed or after the task is completed (e.g., navigation or path planning information). If the task performance module 512 needs to consume more computing resources than were allocated by the resource manager 112, the task performance module 512 may request that the resource manager 112 allocate additional resources as needed. In some embodiments, the computing task may be performed by the edge server 104 rather than the cloud server 110.

Still referring to FIG. 5, the data consumption monitoring module 514 monitors the actual amount of computing resources consumed by the task performance module 512 in performing the task. While the edge server 104 predicts an amount of computing resources that will be needed to perform the computing task, the actual amount of resources needed to perform the computing task may be greater or less than this predicted amount. By measuring the actual amount of resources used to perform the computing task, the machine learning model that made the prediction about resource usage may be improved such that it makes better predictions in the future, as explained in further detail below. After the task performance module 512 completes the requested computing task and the data consumption monitoring module 514 has determined the actual amount of computing resources consumed in so doing, the network interface hardware 506 may transmit the amount of resources consumed to the edge server 104. In some embodiments, the network interface hardware 506 transmits this data to the resource manager 112, which then retransmits the data to the edge server 104.

After the edge server 104 receives this data about actual resource consumption from the cloud server 110, the edge server 104 may use this data to improve the performance of the selected machine learning model. However, it may be desirable to first clean this data. Thus, referring back to FIG. 3, the data preprocessor module 318 performs preprocessing on the data relating to the actual amount of resources used to perform the computing task. The data preprocessor may perform the tasks of, but not limited to, normalizing the data, removing outliers, and the like. After the data preprocessor module 318 cleans this data, the data can be used by the training data updating module 320, as explained below.

Still referring to FIG. 3, the training data updating module 320 may update training data associated with the selected machine learning model. As explained above, the machine learning model is trained with historical data of particular computing tasks and the amount of computing resources that were needed to perform those computing tasks. Thus, the more such training data is available, the more accurate the machine learning model is able to be in making future predictions about the amount of computing resources needed to perform computing tasks. Accordingly, the training data updating module 320 may update the training data for the selected machine learning model with the new data about the actual resource consumed while performing the requested computing task. As such, the selected machine learning model may be re-trained with the updated training data to improve the accuracy of future predictions made using the selected machine learning model.

Figure 6:
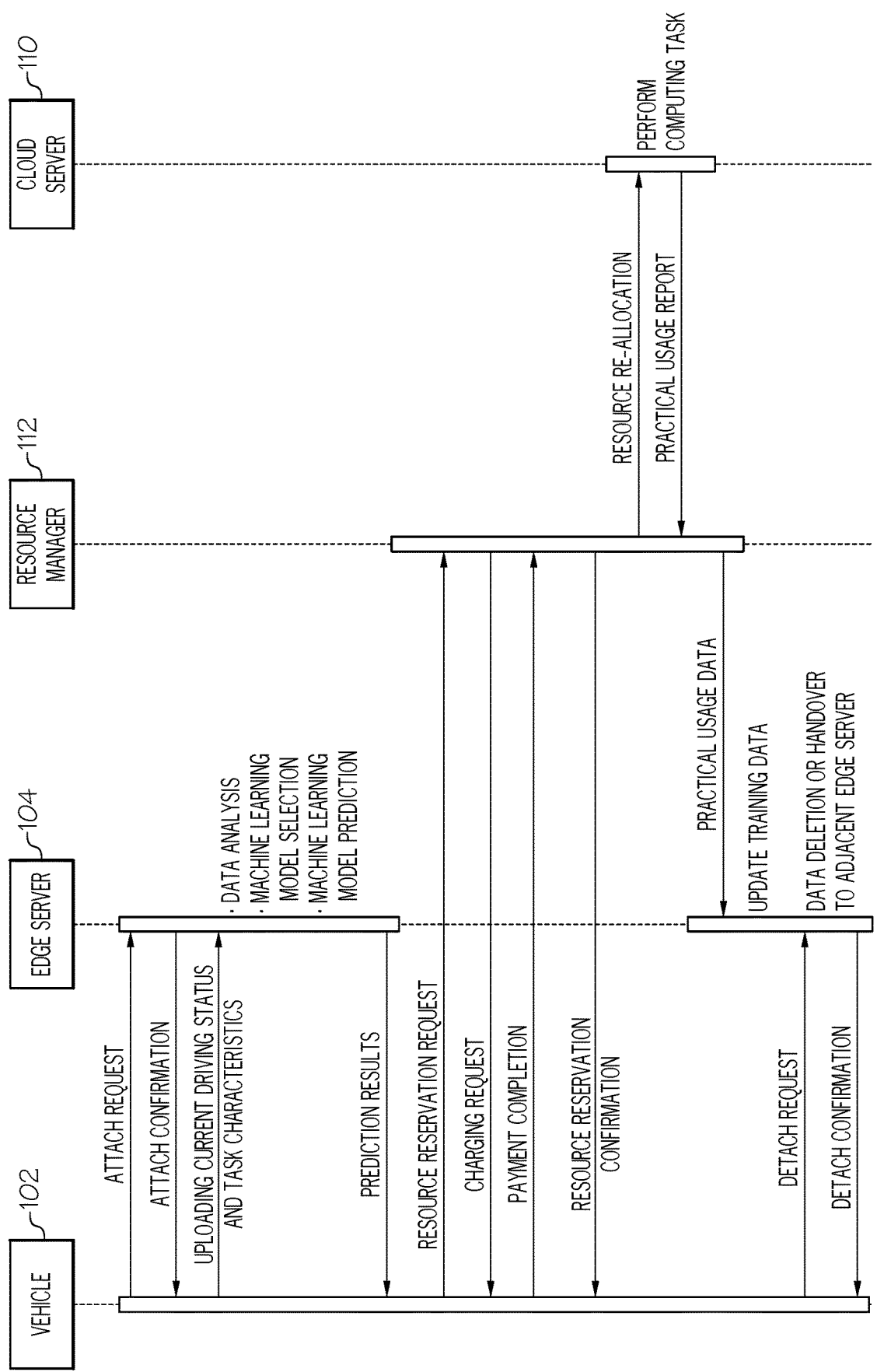
FIG. 6 depicts an operational sequence of predicting an amount of computing resources needed to perform a computing task requested by a vehicle, according to one or more embodiments shown and described herein.

FIG. 6 depicts an operational sequence of predicting an amount of computing resources needed to perform a computing task and performing the task, according to one or more embodiments shown and described herein.

In embodiments, the vehicle 102 may submit an attach request to the edge server 104. This attach request allows the vehicle 102 to attach or connect to the edge server 104 and to transmit and receive data from the edge server 104 while the vehicle is within the service area of the edge server 104. After the edge server 104 receives the attach request from the vehicle 102, the edge server 104 may transmit an attach confirmation to the vehicle 102 signifying that the vehicle 102 and the edge server 104 are connected. Once the vehicle 102 is attached to the edge server 104, the task requesting module 218 of the vehicle 102 can submit a request for a computing task to the edge server 104 along with driving status of the vehicle and the task characteristics (e.g., the task generation frequency as determined by the task scheme selection module 220).

After the edge server 104 receives the request for the computing task, the machine learning selection module 312 of the edge server 104 may analyze the received data about the driving status of the vehicle and the task characteristics and select an appropriate machine learning model for predicting the amount of resources needed to perform the computing task. The resource prediction module 316 of the edge server 104 may then use the selected machine learning model to predict the computing resources needed to perform the computing task. The edge server 104 may then send the prediction results to the vehicle 102.

After receiving the prediction results regarding the amount of computing resources necessary to perform the computing task, the reservation request module 222 of the vehicle 102 may submit a request to reserve the appropriate resources to the resource manager 112. Upon receiving this request, the resource manager 112 may submit a charging request to the vehicle 102 requesting payment for the requested resources. The vehicle 102 may then submit the appropriate payment to the resource manager 112 and the resource manager 12 may transmit a confirmation of the reservation of the resources to the vehicle 102.

After receiving payment from the vehicle 102 for a reservation of the requested resources, the resource allocation module 414 of the resource manager 112 may allocate the requested resources with the cloud server 110. The task performance module 512 of the cloud server 110 may then use the allocated resources to perform the computing task while the data consumption monitoring module 514 monitors the actual amount of resources so consumed. The cloud server 110 may then transmit the actual amount of resources used to perform to computing task to the resource manager 112, which may then transmit this data to the edge server 104. In some embodiments, the cloud server 110 may transmit this data directly to the edge server 104. The data preprocessor module 318 of the edge server 104 may then process this data and the training data updating module 320 may update the training data of the selected machine learning model with the processed data.

When the vehicle 102 is about to leave the service area of the edge server 104, the vehicle 102 may submit a detach request to the edge server 104 requesting to detach or disconnect from the edge server 104. After receiving this request, the edge server 104 will either delete data received from the vehicle 102 or handover this data to an adjacent edge server whose service area the vehicle 102 is moving into. The edge server 104 may then send a detach confirmation to the vehicle 102.

Figure 7:
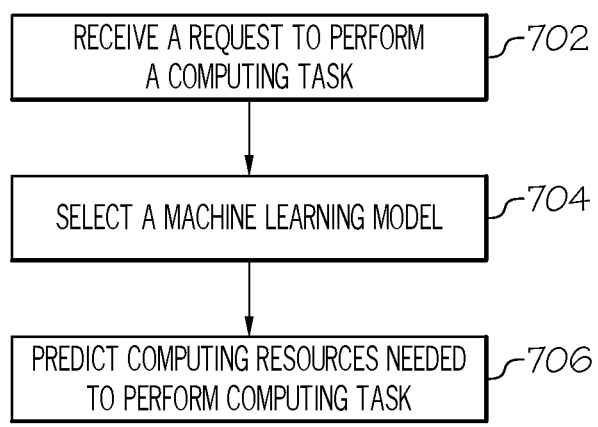
FIG. 7 depicts a flowchart for predicting an amount of computing resources needed to perform a computing task requested by a vehicle, according to one or more embodiments shown and described herein.

FIG. 7 depicts a flowchart for predicting an amount of computing resources needed to perform a computing task, according to one or more embodiments shown and described herein. In step 702, the edge server 104 receives a request from the vehicle 102 to perform a computing task. The request from the vehicle may comprise information about the vehicle (e.g., driving status of the vehicle) as well as characteristics of the computing task. The information received from the vehicle 102 regarding the requested computing task may be temporarily stored in the database 310 of the edge server 104.

In step 704, the machine learning selection module 312 selects a machine learning model from among a plurality of machine learning models stored in the database 310 to predict the amount of computing resources needed to perform the requested computing task. The machine learning selection module 312 may select a machine learning model based on the driving status and the characteristics of the computing task.

In step 706, the resource prediction module 316 uses the selected machine learning model to predict the amount of computing resources needed to perform the requested computing task.

Figure 8:
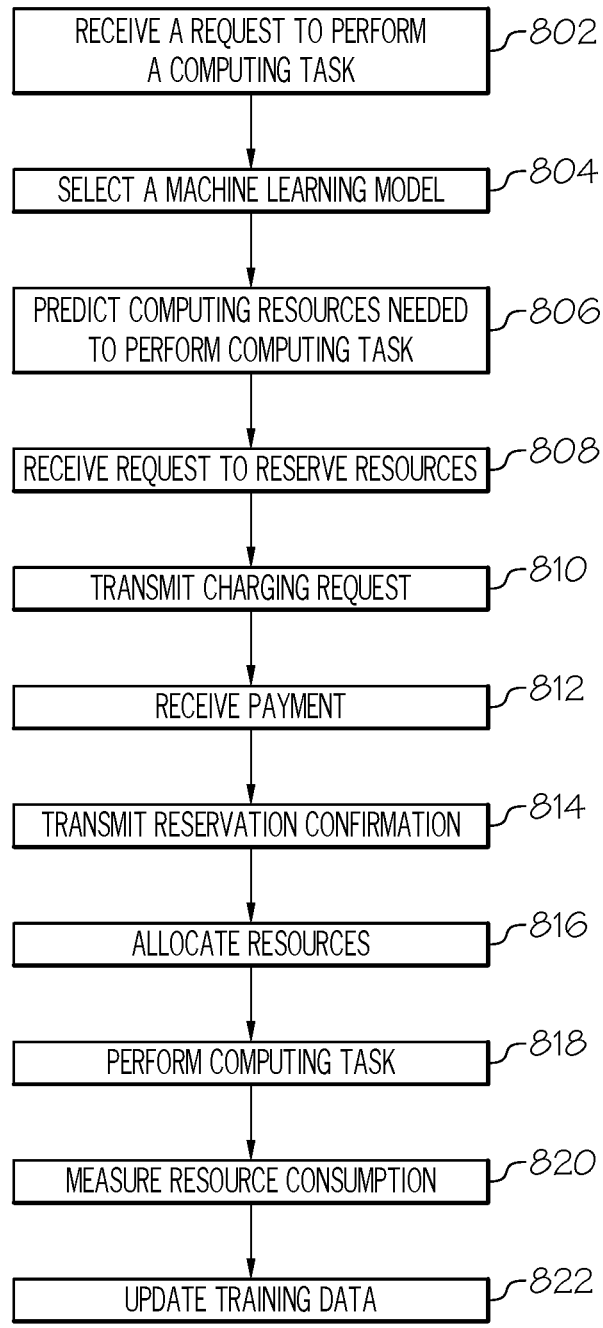
FIG. 8 depicts another flowchart for predicting an amount of computing resources needed to perform a computing task requested by a vehicle and performing the computing task, according to one or more embodiments shown and described herein.

FIG. 8 depicts another flowchart for predicting an amount of computing resources needed to perform a computing task and performing the computing task, according to one or more embodiments shown and described herein. In step 802, the edge server 104 receives a request from the vehicle 102 to perform a computing task. The request from the vehicle may comprise information about the vehicle (e.g., driving status of the vehicle) as well as characteristics of the computing task. The information received from the vehicle 102 regarding the requested computing task may be temporarily stored in the database 310 of the edge server 104.

In step 804, the machine learning selection module 312 selects a machine learning model from among a plurality of machine learning models stored in the database 310 to predict the amount of computing resources needed to perform the requested computing task. The machine learning selection module 312 may select a machine learning model based on the driving status and the characteristics of the computing task.

In step 806, the resource prediction module 316 uses the selected machine learning model to predict the amount of computing resources needed to perform the requested computing task. The edge server 104 may then transmit the predicted amount of computing resources needed to perform the computing task to the vehicle 102. In some embodiments, after predicting an amount of resources needed to perform the computing task, the edge server 104 may transmit a request to the resource manager 112 to reserve this amount of resources.

In step 808, the resource manager 112 receives a request from the vehicle 102 to reserve computing resources for performing the computing task. The amount of computing resources that the vehicle 102 requests to be reserved may be equal to the amount of resources that the edge server 104 predicts are needed to perform the computing task.

In step 810, the resource payment module 412 of the resource manager 112 transmits a charging request to the vehicle 102. The charging request comprises a request for payment for the resources that the vehicle is requesting to reserve. In block 812, the resource payment module 412 receives payment from the vehicle 102 for the requested resources. In block 814, the resource payment module 412 transmits confirmation of the resource reservation after receiving payment.

In step 816, the resource allocation module 414 of the resource manager 112 allocates an amount of resources equal to the resource reservation request amount, as explained above in connection with FIG. 4. Then, in step 818, the task performance module 512 of the cloud server 110 consumes the reserved resources and performs the computing task. In some embodiments the computing task may be performed by the edge server 104 rather than the cloud server 110.

In step 820, the data consumption monitoring module 514 of the cloud server 110 monitors the actual amount of resources consumed to perform the computing task. In the illustrated embodiment, the cloud server 110 transmits this data to the resource manager 112, which then transmits the data to the edge server 104. In some embodiments, the cloud server 110 transmits this data directly to the edge server 104.

In step 822, the edge server 104 receives the data about the actual amount of computing resources consumed to perform the computing task. The data preprocessor module 318 then processes this data and the training data updating module 320 updates the training data associated with the selected machine learning model that predicted the amount of computing resources that would be needed to perform the computing task.

Figure 9:
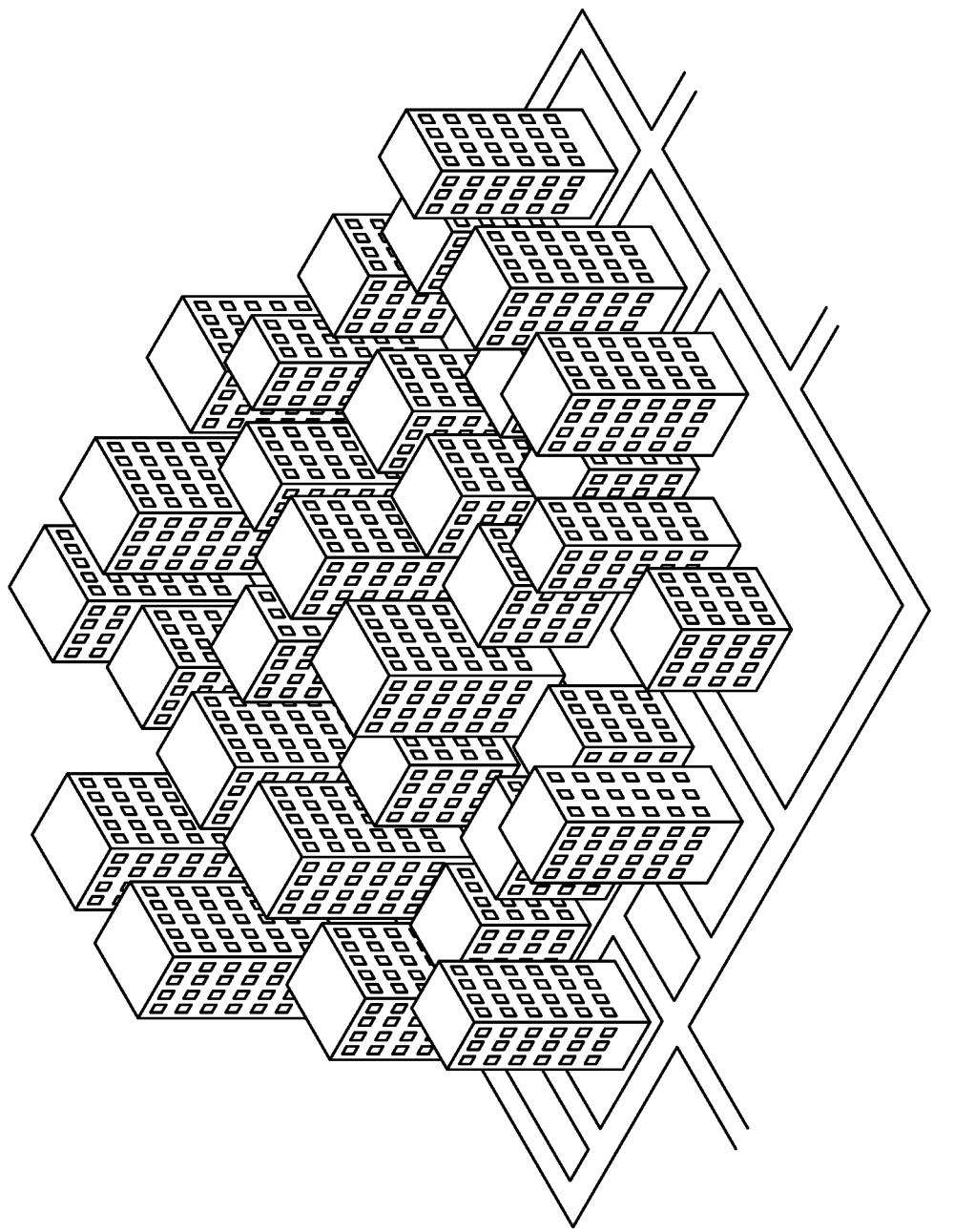
FIG. 9 depicts a 3D model of Manhattan built through Unity used to test different machine learning models.
Figure 10A:
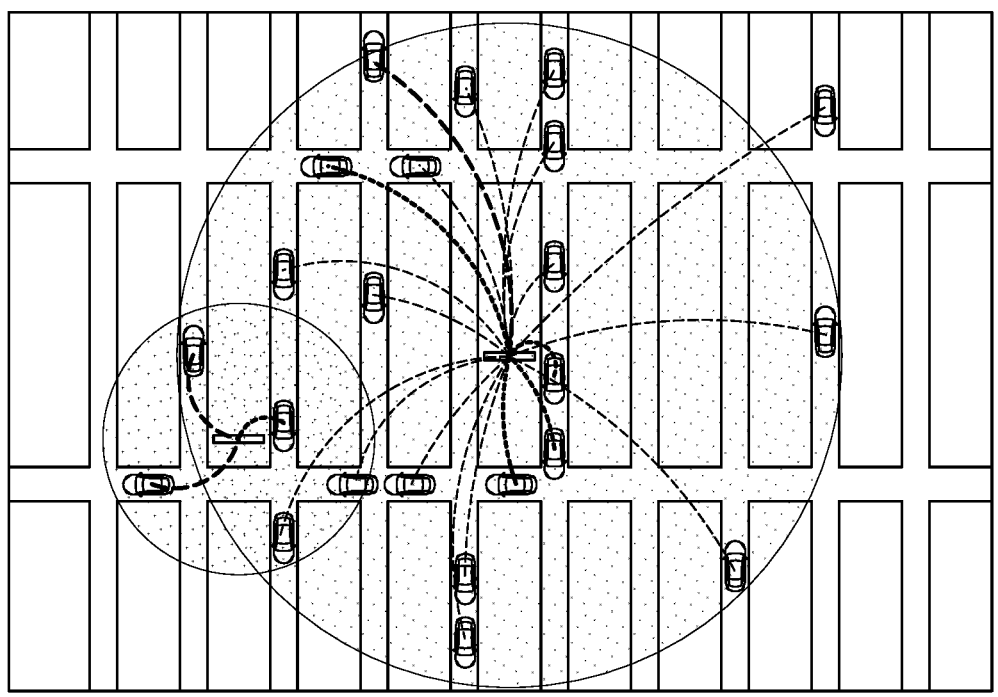
FIG. 10A depicts a 3D model of a multi-intersection scenario used to test different machine learning models.
Figure 10B:
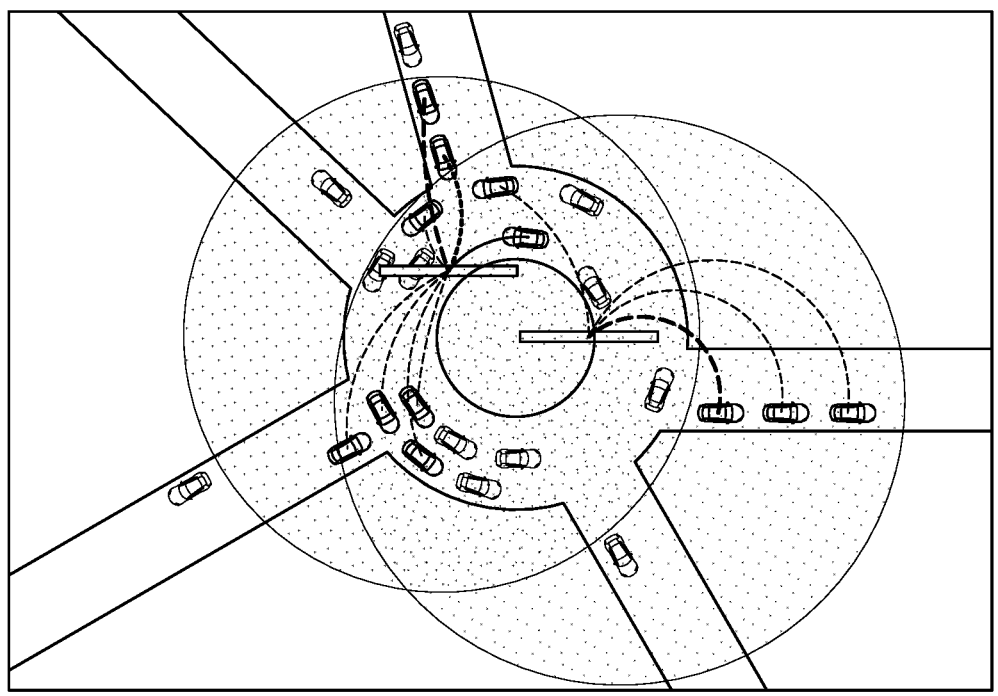
FIG. 10B depicts a 3D model of a roundabout scenario used to test different machine learning models.
Figure 10C:
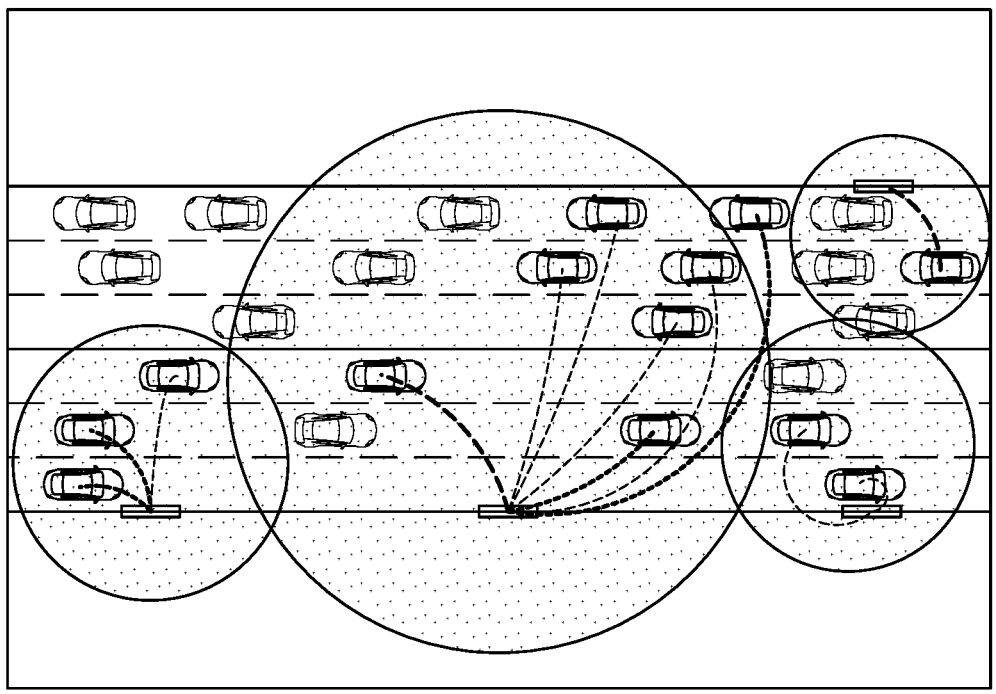
FIG. 10C depicts a 3D model of a highway scenario used to test different machine learning models.
Figure 10D:
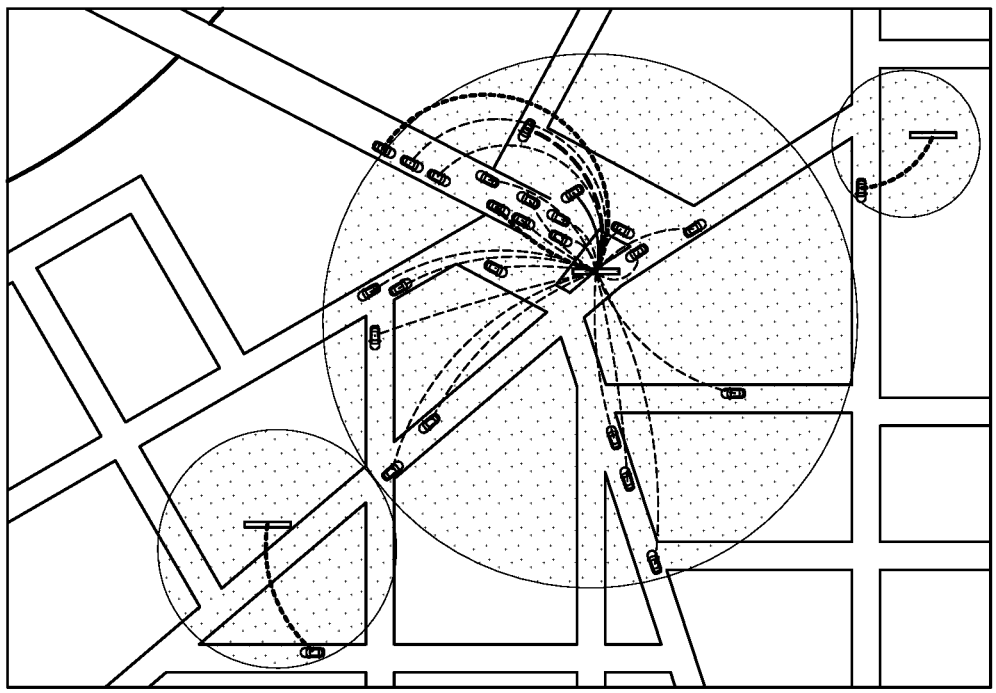
FIG. 10D depicts a bridge scenario used to test different machine learning models.

FIG. 9 is a representation of a portion of a 3D model of real-world Manhattan built through Unity3D that was used to simulate several traffic scenarios and test different machine learning models, such as those that can be selected by the edge server 104 as described above. The traffic AI package (Intelligent Traffic System) was implemented to generate traffic flows. Using this AI package, vehicle models were generated in specified areas and move forward following the pre-defined road network obeying traffic rules. The total number of vehicles appearing in the area can be controlled to simulate peak period and off-peak period.

An edge server model and a vehicle receiver model were built to simulate edge computing assisted computation execution behavior on both units when a vehicle receiver is located within the connection range of an edge server. Every computation offloading task consumes a certain amount of memory of the edge server during the period of task execution. Therefore, memory utilization data can be obtained by documenting the memory consumption of the edge server during the simulation.

Task sizes are defined in the vehicle receiver model to simulate offloading computation with different data size. Accordingly, larger data size will occupy more memory capacity on the edge server, resulting in taking a longer time to be computed or processed. A vehicle receiver model is attached to the vehicle model of the traffic AI package, and edge server models are placed in the area, where it is considered to perform simulated computation offloading service for all vehicles within the range of the edge server.

In order to enrich the scenarios, four specific areas were chosen to simulate traffic flow. Specifically, multiple intersections, a roundabout, a highway, and bridge areas were chosen, as shown in FIGS. 10A-10D, respectively. As shown in FIGS. 10A-10D, edge servers are located just below the horizontal bars, surrounded by a circle representing the coverage range of each edge server. The spline connecting vehicles and edge servers represents the connection link.

In addition to creating different scenarios, the task size in the vehicle receiver model and the number of vehicles utilizing the driving AI package was also varied. The number of cars for multi-intersection, roundabout, highway, and bridge were set as {30, 60, 100}, {20, 35, 50}, 30, 60, 100}, and {45, 90, 150}, respectively. For the small data size situations, the data size is randomly generated within the range of [18, 22]. And for big data size situations, the data size is randomly generated within the range of [36, 44]. Therefore, for each road scenario, there are six datasets in total with the combination of different data size and number of cars. For convenience, the datasets as shown in FIGS.

11-14 are named in the format "Scenario-number of vehicles-datasize." For example, Roundabout-20-B means the data is generated in roundabout scenario with 20 vehicles and the data size is big.

For the four scenarios of FIGS. 10A-10D, six different machine learning models were adopted; namely long short term memory (LSTM), bidirection LSTM (BiLSTM), stacked LSTM (S-LSTM), stacked bidirectional LSTM (S-BiLSTM), S-LSTM with dropout (S-LSTM-D), and S-BiLSTM with dropout (S-BiLSTM-D). For all models, the number of LSTM cells in each layer was set as 64. The activation function was chosen as tan h. For the deep models (S-LSTM, S-BiLSTM, S-LSTM-D, and S-BiLSTM-D), the number of hidden layers was set as three. For S-LSTM-D and S-BiLSTM-D, the dropout percentage was set as 10%. The loss function is defined as the mean square error function and the gradient descent method is Adam.

To evaluate performance, three metrics were used: root mean square error (RMSE), mean absolute percentage (MAP), and mean GEH (MGEH). The definictions of the metrics are defined as:

$$RMSE = \sqrt{\frac{1}{n}\sum_{i=1}^{n}(y_i - Y_i)^2};$$

$$MAPE = \frac{1}{n}\sum_{i=1}^{n}\frac{|(y_i - Y_i)|}{Y_i}; \text{ and}$$

$$MGEH = \frac{1}{n}\sum_{i=1}^{n}\sqrt{\frac{2(y_i - Y_i)^2}{y_i + Y_i}}$$

where $y_i$ is the predicted value and $Y_i$ is the ground truth. The preliminary results for each of the four scenarios are shown in FIGS. 11-14, respectively. For some scenarios, MAPE is not applicable because there are zeros in the dataset.

As can be seen in the data in FIGS. 11-14, among these three metrics, each metric is mostly consistent with the other metrics, at least with respect to the best performing model. One exception is that, for dataset Highway-30-B, the MAPE of S-LSTM-D is smaller than S-BiLSTM, while the RMSE and MEGH behave inversely. As can be seen from FIGS. 15-18, there are 24 datasets in total. Out of the 24 datasets, LSTM works best in 17 cases, BiLSTM works best in 4 cases, S-LSTM works best in 1 case and S-BiLSTM works best in 2 cases.

Usually, deep networks work better than shallow networks, like DNN and ANN, however this is not the case here. The main difference is that in DNN or ANN, an important assumption is the data samples are independent to each other. While for time series data, one significant property is time dependency, which means the information that comes from previous LSTM makes more sense than the information transmitted between layers. In addition, in stacked architecture, if the previous layer already makes a wrong prediction, the next layer will continue to forecast based on incorrect results, which enlarges the error.

In addition, time dependency can also explain why the dropout strategy is not suitable here, since the information that each LSTM cell brings may be of great importance for some cells in the later series. Dropout strategy will erase the randomly selected nits such that anticipation cannot be calculated accurately. Moreover, for time series data, the input can be even two dimensional, i.e., time and value. Unlike high dimensional cases, overfitting is not that common.

Comparing the bidirectional model with the non-bidirectional model, the performances are generally similar. However, there are some numerical differences between them. This is because, if the forward information is different from the backward information, it is easy to introduce bias in the output phase.

As can be seen from these results, the best machine learning model for the different scenarios is different. Thus, selecting different machine learning models for different computing tasks, as described herein, may be beneficial.

It should be understood that embodiments described herein are directed to systems and methods for predicting an amount of computing resources needed to complete a computing task requested by a vehicle. An edge server receives a request to perform a computing task from a vehicle within a service area of the edge server. Based on the characteristics of the computing task to be performed, the edge server selects a machine-learning model that is best suited to predict the amount of computing resources needed to perform the computing task. Based on this prediction, an appropriate amount of computing resources may be reserved. The reserved resources may then be consumed to perform the computing task.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   receiving a request from a vehicle to perform a computing task;
   selecting a machine learning model from among a plurality of machine learning models based at least in part on the request;
   predicting an amount of computing resources needed to perform the computing task using the selected machine learning model; and
   allocating the amount of computing resources equal to the amount of computing resources predicted to be needed to perform the computing task.

2. The method of claim 1, further comprising:
   receiving, from the vehicle, information about a driving state of the vehicle; and
   selecting the machine learning model based at least in part on the driving state of the vehicle.

3. The method of claim 2, wherein the information about the driving state of the vehicle comprises a speed of the vehicle.

4. The method of claim 1, further comprising:
   receiving, from the vehicle, information related to the computing task; and
   selecting the machine learning model based at least in part on the information related to the computing task;

wherein the information related to the computing task comprises one or more of:
a size of the computing task;
a deadline of the computing task;
an application type of the computing task;
a frequency of the computing task; and
whether the computing task is deadline sensitive.

5. The method of claim 1, further comprising:
determining whether a current allocation of resources is sufficient for performing the computing task;
in response to the current allocation of resources being not sufficient for performing the computing task, allocating additional resources for performing the computing task; and
in response to the current allocation of resources being sufficient for performing the computing task, reallocating currently allocated resources that are not needed for performing the computing task to another resource provider in a second region.

6. The method of claim 4, wherein the frequency of the computing task comprises a time based generation frequency.

7. The method of claim 4, wherein the frequency of the computing task comprises a mileage based generation frequency.

8. The method of claim 4, wherein the frequency of the computing task comprises a velocity based generation frequency.

9. The method of claim 4, wherein the frequency of the computing task comprises a non-periodic generation frequency.

10. The method of claim 1, further comprising:
performing the computing task;
determining an amount of resources consumed while performing the computing task; and
updating training data for the selected machine learning model based on the amount of resources consumed while performing the computing task.

11. An edge server comprising:
one or more processors;
one or more memory modules; and
machine readable instructions stored in the one or more memory modules that; when executed by the one or more processors, cause the edge server to:
receive a request from a vehicle to perform a computing task;
receive a driving status of the vehicle;
select a machine learning model from among a plurality of machine learning models based at least in part on the request and the driving status;
based on the selected machine leaning model, predict an amount of computing resources needed to perform the computing task; and
allocate the amount of computing resources equal to the amount of computing resources predicted to be needed to perform the computing task.

12. The edge server of claim 11, wherein the machine readable instructions stored in the one or more memory modules, when executed by the one or more processors, cause the edge server to:
tune one or more hyperparameters of the selected machine learning model based at least in part on the request or the driving; status.

13. The edge server of claim 11, wherein the machine readable instructions stored in the one or more memory modules, when executed by the one or more processors, cause the edge server to:
receive a task generation frequency related to the computing task from the vehicle; and
select the machine learning model based at least in part on the received task generation frequency.

14. The edge server of claim 11, wherein the machine readable instructions stored in the one or more memory modules; when executed by the one or more processors, cause the edge server to:
receive data relating to an amount of resources consumed while performing the computing task; and
update training data associated with the selected machine learning model based on the received data relating to the amount of resources consumed while performing the computing task.

15. The edge server of claim 14, wherein the machine readable instructions stored in the one or more memory modules, when executed by the one or more processors, cause the edge server to:
preprocess the data relating to the amount of resources consumed while performing the computing task before updating the training data associated with the selected machine learning model.

16. A system comprising:
an edge server;
a cloud server communicatively coupled to the edge server; and
a resource manager communicatively coupled to the cloud server,
wherein the edge server is configured to:
receive, from a vehicle, a request to perform a computing task and a driving status of the vehicle;
select a machine learning model from among a plurality of machine learning models based at least in part on the request and the driving status; and
predict an amount of computing resources needed to perform the computing task based on the selected machine learning model;
wherein the resource manager is configured to allocate an amount of computing resources for performing the computing task to the cloud server or the edge server; and
wherein the cloud server is configured to use the allocated computing resources to perform the computing task.

17. The system of claim 16, wherein the edge server is configured to tune one or more hyperparameters of the selected machine learning model based at least in part on the request or the driving status.

18. The system of claim 16, wherein:
the cloud server is configured to monitor an amount of resources consumed while performing the computing task and transmit this information to the edge server; and
the edge server is configured to update training data associated with the selected machine learning model based on the amount of resources consumed while performing the computing task.

19. The system of claim 18, wherein the cloud server is configured to preprocess data related to the amount of resources consumed while performing the computing task before updating the training data associated with the selected machine learning model.

* * * * *

UNITED STATES PATENT AND TRADEMARK OFFICE
CERTIFICATE OF CORRECTION

PATENT NO.        : 11,567,495 B2
APPLICATION NO.   : 16/710590
DATED             : January 31, 2023
INVENTOR(S)       : Chen et al.

It is certified that error appears in the above-identified patent and that said Letters Patent is hereby corrected as shown below:

In the Specification

In Column 17, Line(s) 20, delete "definictions", and insert --definitions--, therefor.

In the Claims

In Column 19, Line(s) 65, Claim 12, delete ";".

Signed and Sealed this
Twenty-first Day of March, 2023

Katherine Kelly Vidal
*Director of the United States Patent and Trademark Office*